July 18, 1961   B. WALTERSCHEID-MÜLLER ET AL   2,992,548

UNIVERSAL-JOINT SHAFT ASSEMBLY

Filed Aug. 5, 1959

*Inventors:*
BERNHARD WALTERSCHEID-MÜLLER
KURT SCHRÖTER

By Toulmin & Toulmin
Attorneys

United States Patent Office 2,992,548
Patented July 18, 1961

2,992,548
UNIVERSAL-JOINT SHAFT ASSEMBLY
Bernhard Walterscheid-Müller and Kurt Schröter, Lohmar, Rhineland, Germany, assignors to Jean Walterscheid, Maschinenfabrik and Hammerwerk, Siegburg, Germany
Filed Aug. 5, 1959, Ser. No. 831,862
Claims priority, application Germany Mar. 28, 1959
16 Claims. (Cl. 64—23)

The present invention relates to a universal-joint shaft assembly, more particularly to a two-joint shaft assembly which has a variable length.

In known universal-joint shaft assemblies, transmission of high torques results in a considerable frictional resistance which not only greatly increases the wear of the bearing surfaces on the shafts but also of the universal joints. The strong axial forces exerted upon the yokes of the universal joints will greatly decrease the life of the universal joints. In addition, the frictional resistance between the bearing surfaces of the shafts causes a rapid erosion or eating away of the shaft material at that point. Occasionally, the co-acting bearing surfaces of the torque-transmitting shaft elements become welded together. This greatly reduces the flexibility of the shaft, as it interferes with the axial slip between the shaft elements.

The present invention provides a universal-joint shaft assembly which eliminates the above disadvantages. In this shaft assembly, driving dogs are loosely positioned between the telescoping surfaces of the shaft. These dogs are also capable of axial movement between the shafts. The driving dogs are essentially rod-like and are positioned in registering opposed grooves on the inner and outer telescoping shafts. The ends of the driving dogs may be rounded off, or may be conical.

The grooves in the shafts for retaining the driving dogs are so shaped that the driving dogs have narrow contact areas during the transmission of torque by the shaft assembly. These grooves have a cross section which may be triangular or trapezoidal. It is not necessary that registering grooves both have the same cross section, since a groove for one shaft may have a triangular cross section and the cooperating groove on the other shaft have a trapezoidal cross section.

The universal-joint shaft assembly of the present invention is a substantial step forward in the art since it considerably reduces the resistance against changes in length of the shaft assembly during the transmission of torque. Furthermore, the frictional areas during the variations in length are considerably reduced. Accordingly, the welding of the contact areas and the eroding of these areas is eliminated. It has been determined that the contact areas of the present invention have a considerably greater life as compared to the conventional universal-joint shaft assembly.

The driving dogs, which have circular cross sections, are simple in structure and hence may be inexpensively and rapidly manufactured. Since the driving dogs are loosely or floatingly received within registering grooves, the rotational movement of the dogs in the grooves will result in a centering of the dog in its pair of grooves. This also will result in decreasing the wear and in increasing the life of the shaft assembly. The driving dogs may be readily replaced when necessary. Further, by properly selecting the diameter of the driving dogs with respect to the depth of the grooves, any desired play between the telescoping shafts may be obtained. When the grooves have become worn, driving dogs having a slightly greater size can be inserted, and accordingly the entire shaft assembly can continue in operation for a long period of time. The rods may be slightly bent before assembling and the resulting shaft assembly would have no play even though the diameter of the driving dogs is such as to permit a play between the shafts if the dogs were straight.

Additional advantages accrue from the shaft assembly of this invention with respect to the problem of lubrication during the varying of the length of the universal-joint shaft assembly. When using a conventional spline connection between the shafts of the shaft assembly, the lubricant, which is usually a grease, is forced off the contact surfaces by the sharp edges of the splines. In the present invention, however, the lubricant is continuously circulated around the dogs and within the grooves because of the rotational and axial movement of the dogs within the grooves when the shafts are transmitting torque. This movement of the grease is increased when the shafts are provided with rounded ends having a large radius or the ends are conical shaped.

The manufacturing of the telescoping shafts, particularly of the grooves for the driving dogs, is considerably simplified in the present invention since it is not necessary that the surfaces be made to high standards. After a short period of operating the shaft assembly of this invention, the driving dogs will cause a compacting of the grooved surfaces. Once this has been accomplished, the shaft assembly is ready to operate for a long period of time.

When rods having a circular cross section are used as driving dogs, the shaft assembly may be disassembled and then reassembled after rotating of the shafts with respect to each other so that any given driving dog will be received in another groove. This constant shifting of the contact areas will considerably increase the life-time of the universal-joint assembly. The rotation of the dogs about their own axes, which will occur during axial movement of the dogs, will greatly decrease the sliding resistance between the dogs and the walls of the grooves. This is true because the friction is not sliding but of a rotary nature. Therefore, by providing driving dogs which have limited or narrow contact areas with the walls of the grooves, considerable reduction of friction is obtained and accordingly the life of the shaft assembly is increased.

It is therefore the principal object of this invention to provide a novel and improved universal-joint shaft assembly which will have a greatly increased life.

It is another object of this invention to provide a universal-joint shaft assembly wherein the friction due to variations in length of the shaft assembly is considerably decreased.

Other objects and advantages of this invention will become apparent upon reference to the accompanying description when taken in conjunction with the following drawings, wherein.

Figure 1:
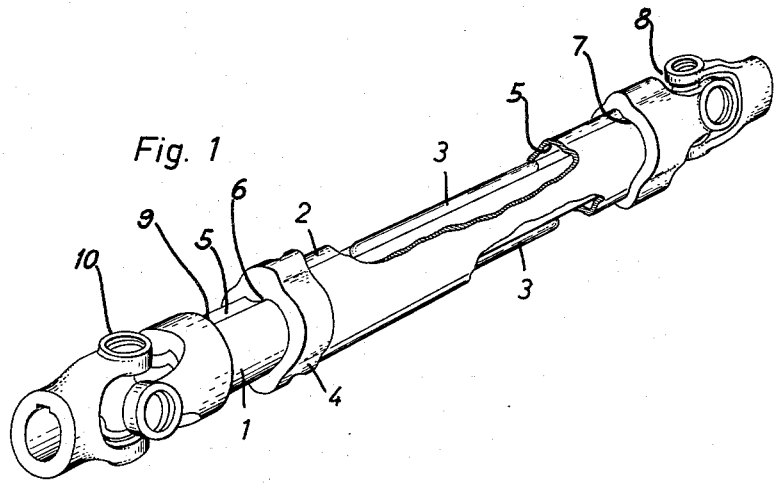
FIGURE 1 shows a perspective view of the universal-joint shaft assembly of this invention with portions of the outer shaft being removed.

Returning now to the drawings, wherein like reference symbols indicate the same parts throughout the various views, there is shown in FIGURE 1 a universal-joint shaft assembly which has a variable length. This shaft assembly is of the type commonly referred to as a two-joint assembly and comprises an inner driving shaft 1 which may either be hollow or solid. The outer driving shaft 2 is hollow and has a cross section similar to that of the inner driving shaft and is telescoped over the end of the inner shaft. The shafts of this invention are shown to have an elliptical or oval cross section. Axially extending grooves 5 are provided on the outer peripheral surface of the inner shaft 1 and on the inner peripheral surface of the outer shaft 2. The grooves are positioned on the respective shafts so that pairs of grooves may be in registering relationship.

Positioned in each pair of registering grooves is a rod-like driving dog 3 which has a circular cross section. The ends of the driving dogs may be rounded or conical. The driving dogs are so shaped as to loosely or floatingly be positioned in the grooves. Accordingly, the dogs are free to rotate within the registering grooves and are also axially movable therein.

There is a shaft seal 4 on the inner or overlapping end of the outer shaft 2. The shaft seal has an abutment 6 which extends into the groove of the inner shaft so as to limit the axial movement of the driving dog therein. There is also an abutment on the inner or overlapped end of the inner shaft 1, which limits the axial movement of the dog in the opposite direction. This last-mentioned abutment is not seen in the drawings.

The outer end 7 of the outer shaft 2 is connected to a yoke of a universal joint 8. The outer end 9 of the inner shaft 1 is also connected to a yoke of another universal joint shown at 10. The other yokes of both the universal joints may be connected so as to transmit power from a driving shaft to a driven shaft.

Figure 2:
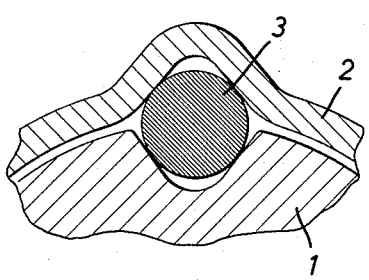
FIGURE 2 is a partial sectional view taken transversely across the shaft assembly shown in FIGURE 1 showing the position of the driving dogs within the grooves.

As can be seen in FIGURE 2, the registering grooves 5 have substantially a triangular or V-shaped cross section. Accordingly, the driving dog 3 will have only a narrow or limited contact area with the walls of the registering groove.

Figure 3:
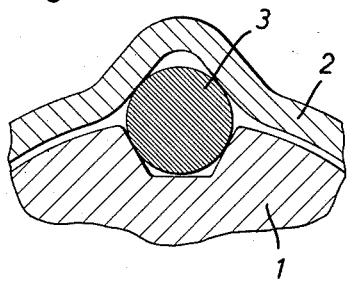
FIGURE 3 is a sectional view similar to that of FIGURE 2 but showing grooves having a different cross section.

In FIGURE 3 the groove in the outer shaft is V-shaped, but the registering groove in the inner shaft is substantially trapezoidal in shape. A trapezoidal shape is essentially channel shaped with outwardly diverging side walls.

Figure 4:
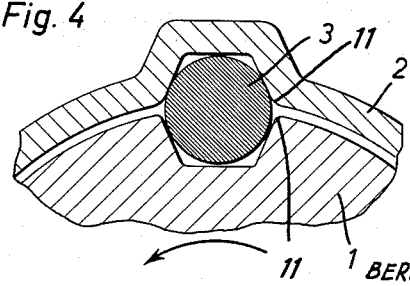
FIGURE 4 is also a sectional view similar to that of FIGURE 2 but showing grooves which have essentially a channel cross section.

In FIGURE 4 both of the registering grooves are shown to have a channel shape wherein the side walls are diverging.

As seen in FIGURE 4, the shoulders of the grooves indicated at 11 may be higher than other shoulders of the grooves. Thus, when the shaft is rotating in a counterclockwise direction, as viewed in FIGURE 4, the higher shoulders will enable the shaft assembly to transmit a greater torque when rotating in this direction than when rotating in the other or clockwise direction.

Instead of a single driving dog in each pair of registering or opposed grooves, a plurality of shorter driving dogs may be positioned therein.

While all the components of the shaft assembly are made from high-strength steels, the driving dogs may be constructed from steels which have a strength approximately one-third the strength of the steel from which the shafts are fabricated. The surfaces of the driving dogs may be hardened by any one of several metallurgical processes, or, if desired, the surfaces may be ground and polished.

If desired, play may be eliminated between the shaft and the shaft assembly by slightly bending the driving dogs before they are inserted into the grooves. Subsequent forcing of the bent dogs into the grooves will enable the dogs to be tightly received therein, and consequently the play between the shafts will be eliminated.

In view of the fact that the driving dogs, which are movably positioned between the telescopically arranged shafts, provide for a self-centering of the telescoping shafts, it is not necessary to reassemble the shafts in precisely the same relationship whenever they have been disassembled for maintenance or for other purposes. Actually, the rearrangement of the components (that is, by positioning the driving dogs in different grooves when the shaft assembly has been disassembled) will greatly increase the length of the life of the shaft assembly.

The abutments for limiting the axial movement of the driving dogs may be either stationary or they may be resilient. These abutments also serve to prevent an unintentional pulling apart of the telescoping shafts.

While driving dogs have been disclosed having a circular cross section, other shaped driving dogs may be used to achieve the advantages of this invention as long as these dogs are loosely received within opposed grooves so as to be capable of axial movement therein and so as to be floatingly arranged in the grooves.

When the shaft assembly of this invention is in position and variations in length of the shaft occur, the inner and outer shafts will be displaced axially with respect to each other. The driving dogs may either remain in their position during this axial movement of the shafts, or, if they are engaged with the abutments, will also be axially moved within the grooves. The axial movement of the dogs when the length of the shaft assembly is being varied will prevent a so-called "welding" together of the torque-transmitting surfaces of the shaft assembly during any sudden surges in the torque being transmitted by the shaft assembly. At the same time, the axial and rotary movement of the driving dogs will keep the lubricant in constant movement so that all contact and driving areas will be well lubricated.

Thus it can be seen that the universal-joint shaft assembly of this invention provides a successful and surprizingly simple manner of manufacturing such shaft assemblies according to lower standards with respect to accuracy but wherein a shaft assembly is obtained which has a high resistance to wear, a very low resistance to axial displacement between the shaft parts, and which will have a long and useful operating life.

It will be understood that this invention is susceptible to modification in order to adapt it to different usages and conditions, and, accordingly, it is desired to comprehend such modifications within this invention as may fall within the scope of the appended claims.

What we claim is:

1. A universal-joint shaft assembly comprising a pair of telescopically engaged shafts, there being registering grooves in adjacent surfaces of said shafts, rod-like driving dogs movably positioned between said shafts in said registering grooves, said driving dogs being axially movable of said shafts within said grooves and being in substantially linear engagement with the walls of said grooves, and a universal joint on the outer end of each of said shafts.

2. A universal-joint shaft assembly as claimed in claim 1, with said driving dogs having a circular cross section.

3. A universal-joint shaft assembly as claimed in claim 1, with the ends of said driving dogs being rounded.

4. A universal-joint shaft assembly as claimed in claim 1, with the ends of said driving dogs being conical.

5. A universal-joint shaft assembly as claimed in claim 1, with said grooves having a V-shaped cross section.

6. A universal-joint shaft assembly as claimed in claim 1, with said grooves being channel-shaped and having diverging side walls.

7. A universal-joint shaft assembly as claimed in claim 1, with the grooves on one shaft having a V-shaped cross section and the registering grooves on the other shaft having a channel shape with diverging side walls.

8. A universal-joint shaft assembly as claimed in claim 1, with the corresponding shoulders of the grooves being higher than the other shoulders of the grooves so that greater torque can be transmitted by the shaft assembly when rotating in one direction than in the other direction.

9. A universal-joint shaft assembly as claimed in claim 1, with said driving dogs being formed from a material having a strength about one-third greater than the strength of the material from which the shafts are formed.

10. A universal-joint shaft assembly as claimed in claim 9, with the surfaces of said driving dogs being hardened and ground.

11. A universal-joint shaft assembly comprising a pair of telescopically engaged shafts, there being registering grooves in adjacent surfaces of said shafts, rod-like driving dogs being shaped so as to be loosely received within said registering grooves, said dogs being slightly bent so that upon insertion in said grooves said dogs will be immovably retained therein, and a universal joint on the outer end of each of said shafts.

12. A universal-joint shaft assembly comprising a pair of telescopically engaged shafts, there being registering grooves in adjacent surfaces of said shafts, and a plurality of driving dogs having axial play in each pair of registering grooves, said driving dogs being in substantially linear engagement with the walls of said grooves and a universal joint on the outer end of each of said shafts.

13. A universal-joint shaft assembly comprising a pair of telescopically engaged shafts, a universal joint on at least one of the outer ends of said shafts, there being registering grooves in adjacent surfaces of said telescoping shafts, and driving dogs loosely retained between said shafts in each pair of registering grooves to drivingly interconnect said shafts, said driving dogs being in substantially linear engagement with the walls of said grooves.

14. A shaft assembly comprising a non-circular inner solid shaft and a non-circular outer hollow shaft, said inner shaft being telescopically arranged within said outer shaft, said inner shaft having a plurality of axially extending channels and said outer shaft having a plurality of channels opposite said channels in the inner shaft, thereby forming axially extending clearances between said shafts, rod-shaped dogs provided in said clearances, said dogs having axial play and substantially linear engagement with the walls of said channels, and a pair of abutments surrounding the ends of said outer shaft, said abutments engaging both the outer surface of said inner shaft and the channels provided therein, thereby limiting the axial movement of said dogs.

15. A shaft assembly as claimed in claim 14, having a universal joint at the free end of said inner shaft and a universal joint at the free end of said outer shaft.

16. A shaft assembly as claimed in claim 14, wherein said dogs have a circular cross-section.

References Cited in the file of this patent

UNITED STATES PATENTS

| | | |
|---|---|---|
| 754,066 | Hoffman | Mar. 8, 1904 |
| 1,022,909 | Whitney | Apr. 19, 1912 |
| 1,220,483 | Williams et al. | Mar. 27, 1917 |
| 2,338,093 | Caldwell | Jan. 4, 1944 |
| 2,605,622 | Anderson | Aug. 5, 1952 |